US009923810B1

(12) United States Patent
Nguyen

(10) Patent No.: US 9,923,810 B1
(45) Date of Patent: *Mar. 20, 2018

(54) APPLICATION UPDATE USING MULTIPLE DISPARATE NETWORKS

(71) Applicant: OPEN INVENTION NETWORK, LLC, Durham, NC (US)

(72) Inventor: Kevin V. Nguyen, Allen, TX (US)

(73) Assignee: Open Invention Network LLC, Durham, NC (US)

( * ) Notice: Subject to any disclaimer, the term of this patent is extended or adjusted under 35 U.S.C. 154(b) by 72 days.

This patent is subject to a terminal disclaimer.

(21) Appl. No.: 14/686,932

(22) Filed: Apr. 15, 2015

Related U.S. Application Data

(63) Continuation of application No. 13/159,487, filed on Jun. 14, 2011, now Pat. No. 9,042,382.

(60) Provisional application No. 61/354,334, filed on Jun. 14, 2010.

(51) Int. Cl.
*H04L 12/28* (2006.01)
*H04W 80/04* (2009.01)
*H04L 29/12* (2006.01)
*H04L 29/06* (2006.01)
*H04L 12/725* (2013.01)
*H04L 29/08* (2006.01)
*H04L 12/721* (2013.01)

(52) U.S. Cl.
CPC ............ *H04L 45/306* (2013.01); *H04L 45/72* (2013.01); *H04L 67/10* (2013.01)

(58) Field of Classification Search
CPC .............................. H04W 80/04; H04W 4/001; H04L 29/12009; H04L 29/06333; H04L 45/28

See application file for complete search history.

(56) References Cited

U.S. PATENT DOCUMENTS

| | | | | |
|---|---|---|---|---|
| 5,999,740 A | * | 12/1999 | Rowley | G06F 8/65 709/221 |
| 6,856,970 B1 | * | 2/2005 | Campbell | G06Q 40/00 705/35 |
| 7,571,308 B1 | * | 8/2009 | Bahl | H04L 29/12273 709/227 |
| 8,713,641 B1 | * | 4/2014 | Pagan | G06F 21/44 713/153 |
| 2003/0210663 A1 | * | 11/2003 | Everson | H04W 28/06 370/329 |

(Continued)

*Primary Examiner* — Romani Ohri
(74) *Attorney, Agent, or Firm* — Haynes and Boone, LLP

(57) ABSTRACT

A system and method that enables an application to retrieve application update from the software vendor using one or more network connection. The application checks for updates when it is invoked by the user. The checking of updates is done by sending a request to the vendor server via one or multiple network connections. The network connection can be wired or wireless. By using multiple network connections, the update process can send and receive update data faster than using one network connections. Another aspect of the invention is if the checking for update request failed via the default or $1^{st}$ network connection, the application will check for the next available network connection to send the update request. By checking for update from the vendor, the application will always have the most up to date patches, fixes, and/or new features.

20 Claims, 8 Drawing Sheets

(56) References Cited

U.S. PATENT DOCUMENTS

2005/0281191 A1* 12/2005 McGee ............... H04L 43/0811
370/216
2010/0161787 A1* 6/2010 Jones .................. G06F 11/3495
709/224

* cited by examiner

APPLICATION UPDATE USING MULTIPLE DISPARATE NETWORKS

CROSS-REFERENCE TO RELATED APPLICATIONS

This application claims the benefit of and is a continuation of U.S. patent application Ser. No. 13/159,487, filed on Jun. 14, 2011, entitled "APPLICATION UPDATE USING MULTIPLE DISPARATE NETWORKS", which claims the benefit of U.S. Provisional Patent Application No. 61/354,334, filed on Jun. 14, 2010. The subject matter of the earlier filed applications are hereby incorporated by reference in their entirety.

FIELD OF INVENTION

This invention relates to a system and method for updating application remotely using one or multiple network connections in a networked capable device.

BACKGROUND OF THE INVENTION

Application updating over a network is an effective way to keep an installed application on a network capable device up to date with a new release and/or fixes. A networked capable device can be a personal computer, a laptop, a net book, a mobile device, a music player, an electronic book enabled device and any device including a processor and memory that can receive and/or transmit data over a network. It would be beneficial for the application updating process to be able to send and receive update information to and from more than one wired or wireless network connections, in order to selectively and/or dynamically determine which network to use in case of network routing failure. When a user invokes an application on his/her network capable device with wired and wireless network connections, on a separated thread, an Update Process checks for new updates by connecting and sending a request to the vendor's server.

Once the Update Process connected to the Vendor's server, it sends the application's data to the server for validating and comparing with the data on the server. The application data can include the version number, the installed date and time, the application identifier, the networked capable device information like device id or hardware id, and any other data that can be used to validate and check for the newer version of application on the Vendor's server. The server sends a response back to the Application's Update Process to let it know whether an update is available to download. If an update is available, the Update Process asks the user for permission to download by notifying the user, either through a pop-up dialog window or on the application window. The notification can be right after the Update Process, received the response from the server, or until the user exits from the application. If there is not any update, the Update Process will terminate by itself.

If the user allows new update, the Update Process sends another request to the server to retrieve the new data. If the request to retrieve the new update failed to connect to the Vendor's server on the $1^{st}$ network connection, the Update Process will send the request to the second network connection. If the user chooses not to update his/her application, then the Update Process terminates by itself until next time when the user invokes the application.

SUMMARY OF THE INVENTION

The disclosure allows an installed application Update Process to dynamically determine which network connection to use in case of network routing failure. The Update Process will interface with the Routing Program, that described in the Simultaneous Operation Of A Networked Device Using Multiple Disparate Networks invention, to connect and route the Update Process's data between the application and the vendor's server. The Routing Program will determine which network connection to use for the data routing.

In one aspect of the disclosure, the system shows the Update Process send and receive data without the Routing Program that described in the Simultaneous Operation Of A Networked Device Using Multiple Disparate Networks invention. A mobile device, like a smart phone, usually has voice/data connection where the data is routed via the phone carrier network and the Wi-Fi connection where the data is route via the user wireless network or any available Wi-Fi network in the area. The Update Process will use the preferred connection that is set by the phone configuration to send and receive update data. If the Update Process is unable to connect to the Vendor's server via the default connection, for example, the voice/data connection, it will connect to the server using the secondary connection, the Wi-Fi connection. If both networks are unavailable, the Update Process will terminate itself until next time when the user invokes the application.

In another aspect of the disclosure, the system shows the Update Process in a mobile device use the best available network connection to check for application update. The measurement for the best available network for a mobile device is the signal strength of the voice/data connection via the phone carrier network or the Wi-Fi connection. The Update Process retrieves the signal strengths of all available network connections in the device then chooses the best connection with the strongest signal strength to use for checking application's update.

In another aspect of the disclosure, the system shows the Update Process used the fastest network connection in a mobile device to check for application update. One way to determine which available network connection has the fastest data transfer rate is to send the request for application update to all available networks in a mobile device. The first network connection that receives response is the fastest one. The same network connection is also use to download the new update if it is available and approved by the user. All other subsequence network connections are disconnected and ignored the response if any.

In another aspect of the disclosure, the system shows the Update Process used more than one network connection in a mobile device to check for application update. The Update Process retrieve available network connection, determine the signal strength of each network connection for stable data routing, and use those network connections for send request and receive application update data. The checking for Application update can send to the $1^{st}$ network connection and the download the update data can send to the $2^{nd}$ network connection. In the case of multiple applications running in a mobile device. The same process can be use to maximize the network bandwidth for faster transferring data in a mobile device.

In another aspect of the disclosure, the system describes how to connect to the Vendor's server, check for new updates, and validate the user's application before allowing the Update Process downloads new data from the server. The connection to the server needs to be a secured connection by using a SSL (Secured Socket Layer) protocol to prevent illegal data capture for duplicating the process. The protocol uses a third party Certificate Authority to identify the server or both the client and the server of the transaction then the client encrypts the data with the server's public key and send the encrypted data to the server. The server decrypts the data; process the request, then encrypts the response and sends it back to the client. Then, the client decrypts the response for processing. When the Update Process, a client, connected to the vendor's server, it sends a request containing the running application version number, the installed date and time, the application unique identifier, the networked capable device information like device id or hardware id, and any other data that relevant to the application vendor's server. The application version number is use by the server to check for out-of-date application. Other data is used to check for the genius installed application. The server sends response back to the Update Process whether the updated is available for download. Based on the user's response, the Update Process will send another request to the vendor's server to retrieve the update data or terminate the process.

An alternate embodiment of the Update Process shut down when the device's networks are unavailable is to keep sending request to the Vendor's server in a timing interval until the connection is made and received response from the server. Another way is to check if the Vendor's server is reachable across an Internet Protocol network by Ping the host computer on a timing interval. If the Pinging is successful via a network connection of a Network Capable Device then the same network connection can be use the send update request. Ping is an Internet Control Message Protocol echo request whose data is expected to be received back in a reply if the destination is reachable. For example, if a mobile device has multiple network connection like voice/data and Wi-Fi connections then the Update Process can loop to all available network connection and send a Ping to the Vendor's server to check for connectivity.

DETAILED DESCRIPTION OF THE INVENTION

Figure 1:
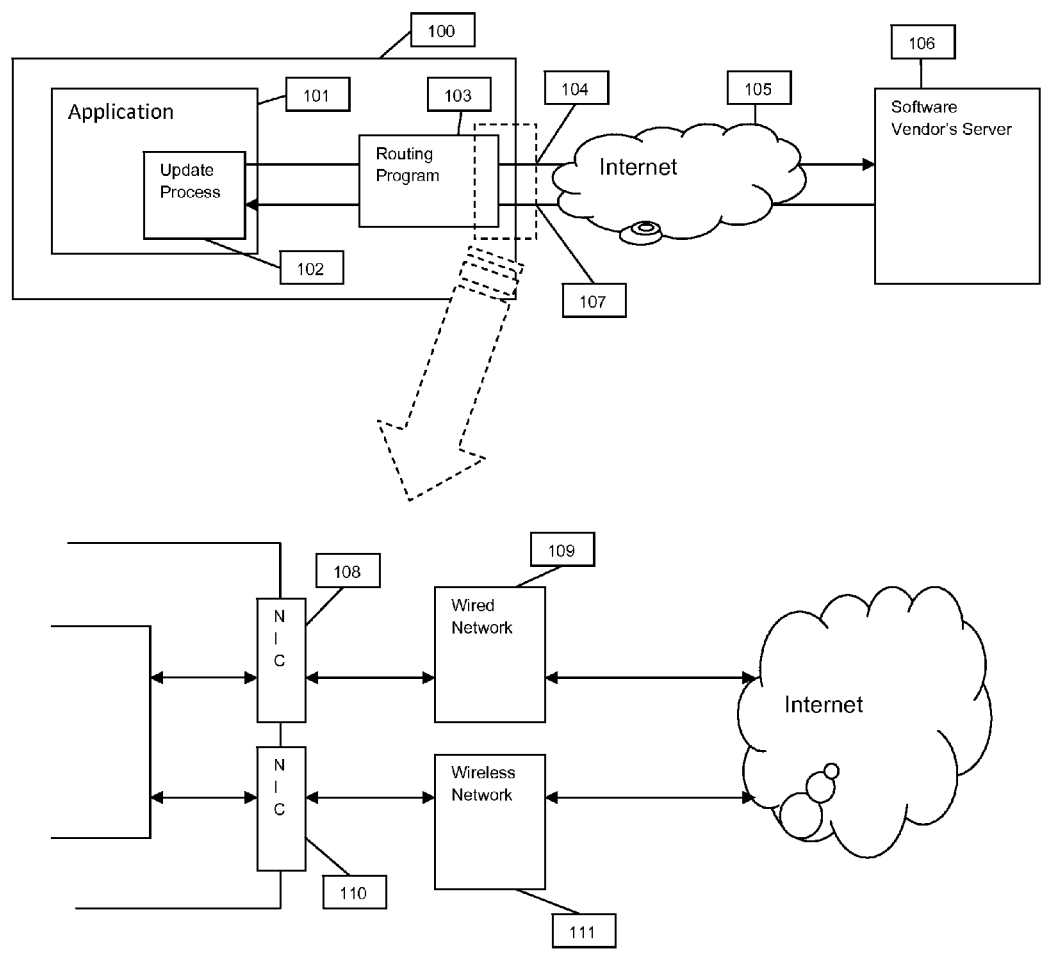
FIG. 1 is a block diagram showing the Update Process interface with the Routing Program to send request and receive response to and from the application vendor's server.

A system in accordance with an embodiment of the disclosure is depicted in FIG. 1. In the system shown in FIG. 1, a networked capable device 100 is connected to the network that has Application 101 installed. Networked capable device 100 may include a non-transitory computer readable storage medium configured to store application 101 that, when executed, is configured to cause a processor to route data between a network device and at least one hub device. When a user invokes Application 101, on a separated thread, an Update Process 102 starts up, retrieve the application data, build the data into a request transaction 104 and send to the Vendor's server 106 via the Routing Program 103 that is running on the networked capable device 100. Another option is that the Update Process can be a menu option on the window application for the user to check new update manually. The process will be the same as above where the Update Process will start up when the user clicks on the menu option. For data security between the client application and the Vendor's server, the Vendor's server is a secured web server that only allows secured connection from the client application, the Update Process 102. For example, the client application creates an http request 104 that will connect to the Vendor's web server using SSL (Secured Socket Layer) protocol, https. The Update Process 102 does not know the existent of the Routing Program 103; it issues a connection and sending the request 104 to the vendor's server. The Routing Program 103 intercepts the request 104 that routes to any active network interface controllers 108 and 110 that are attached or embedded in the device. It determines the routing and sends the request 104 to either wired network 109 or wireless network 111. The Routing Program 103 is installed in the networked capable device as a $3^{rd}$ party software or be part of an operation system. In Windows Operating System, the Routing Program 103 can run as a Windows Service and it would start automatically when the networked capable device 100 starts up. The Vendor's Server 106, receives the request 104, determines if new updates are available to send to the client application 102, then send an http response 107 back to the client 102.

Figure 2:
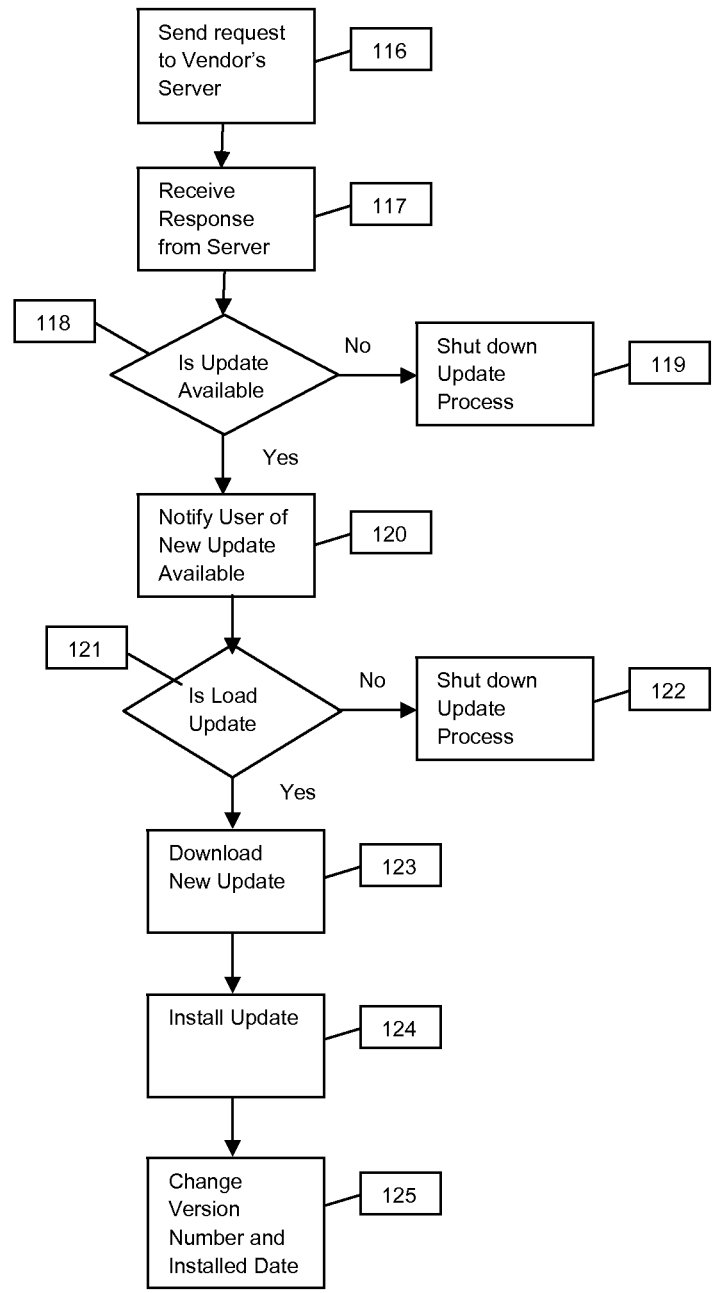
FIG. 2 is a flow diagram showing the Update Process that notifies the user of the new application update that is available for download.

FIG. 2 is a flow chart which describes each step of the Update Process. First, the Update Process sends an https request to the Vendor's secured web server, in step 116. By nature of the SSL, the request is encrypted using the server's key when the Update Process connected to the server. The application data that contains in the request can include the application's version number, the application's installed date and time, the application's unique identifier, and combination of the network capable device information like device id, network id or Mac address, processor id to identify the machine that the application installed. The Vendor's server will use the request data to validate the installed application and check for new update. Whether new updates are available or not, the Vendor's server will send an http response to the client's application, step 117. The Update Process looks at the response to see if new update is available for download, step 118. If new update is not available because the installed application is already up to date, expired application if it is a subscription purchase, or not a genius application in term of illegal copied, the Update Process terminates itself, step 119. If the new updates are available, the Update Process either notifies the user of the new update is available for download or it can wait until the user initiate the shutdown of the application, then notifies the user of new update, step 120. The notification can be a pop up dialog to ask the user for permission to download the new update or on the application's window where the user can download the new update via the menu option, step 121. If the user doesn't want the download new update, the Update Process terminate itself, step 122. If the user wants to download new update, the Update Process sends another secured request to the Vendor's server to request for the download of the new update, step 123. The Vendor's server can send the new updates to the client application via an http response or the server can send the location of the new update data for the client application. The location can be a domain name or an IP Address to where the new update stored. Once the client receives the new updates, or downloads from the server, it installs the new update to the application, step 124. If the installation is successful, the Update Process will update the version number and the installed date in the application then shuts down, step 125.

Figure 3:
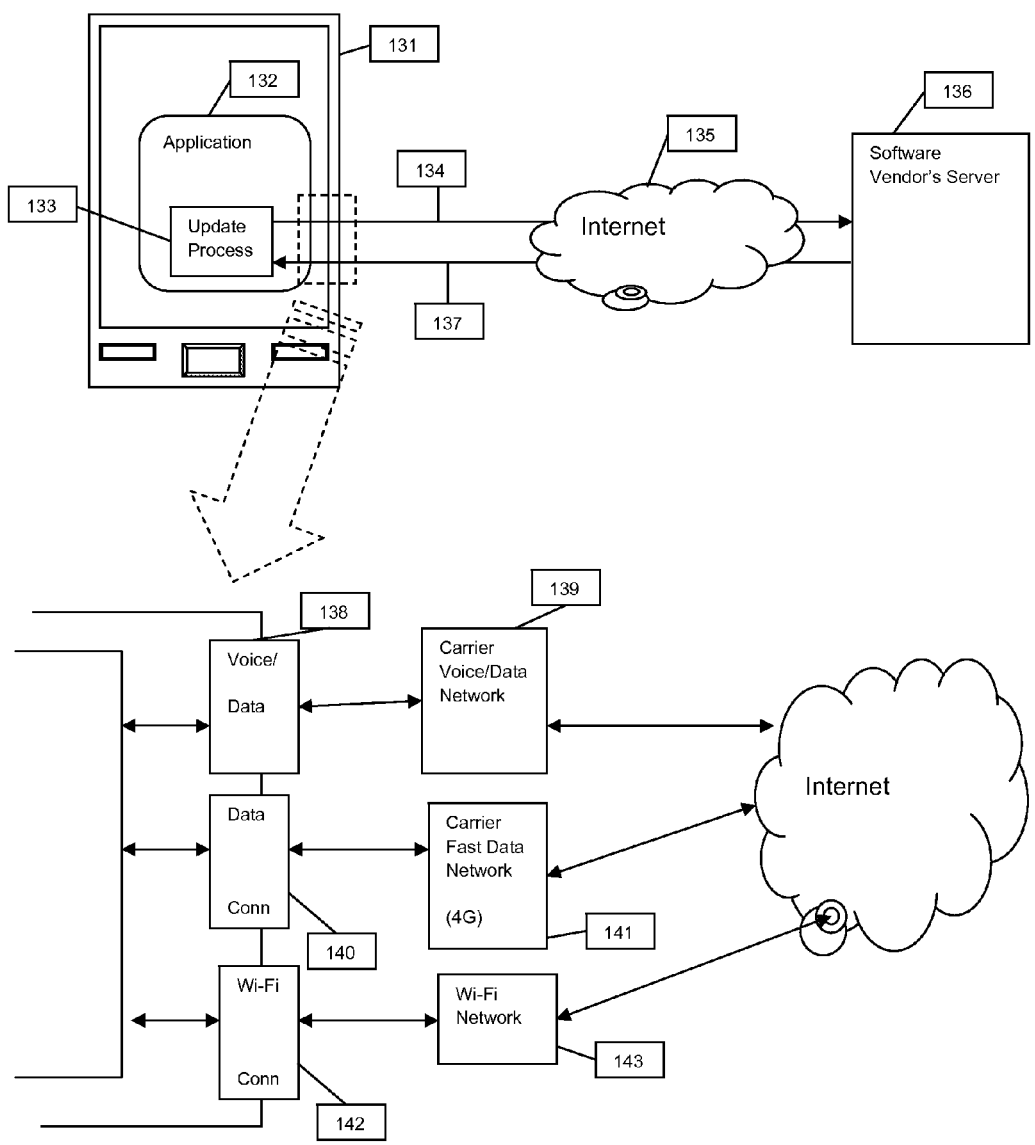
FIG. 3 is a block diagram showing the mobile device Update Process uses either the default network connection to interface with the Application Vendor's server, the secondary network connection, or the third network connection.

As is shown in FIG. 3, the illustrated embodiment of the invention consists of a mobile device which is connected over the network to a Vendor's server for software update. Typically, a mobile device like a smart phone 131 consists of two or more network connections, a voice/data connection 138, a faster data connection 140 like 4G, and a Wi-Fi connection 142. A voice/data connection 138 is a carrier's mobile network 139. A faster data connection 140 is a carrier's mobile data network like WiMax for Sprint or LTE for Verizon. A Wi-Fi connection 140 is the user's wireless or any Wi-Fi hotspot network 141. Instead of use the Routing Program 103 to route the request 134 to the Vendor's server 136, the Update Process 133 can use similar logic in the Routing Program 103 to route the data. When a user invokes Application 132 on a smart phone 131, on a separated thread, an Update Process 133 starts up to automatically check for new software update. The Update Process 133 retrieves the running application data, builds a request 134, and sends it to the Vendor's Server 136 via the default network connection. Usually, the default network connection on a smart phone is the voice/data connection 138. If for some reason, the Update Process 133 cannot connect the Vendor' Server 136 using the voice/data connection 138, then it will send the same request to the Vendor's server 133 using the faster data connection 140. If the Update Process 133 is unable to connect the Vendor's server 136 on either network connection, the process will try to connect to the server using the Wi-Fi connection 142. If the Wi-Fi connection 142 also failed, the process will terminate itself. For example, the Update Process 133 builds an https request with the application data, then sends it to the Vendor's secured web server 136. The steps of sending an https request 134 consists of establishing a connection with the server 136; if the connection is successful, the request 134 is encrypted with the encryption key that is sent by the server 136; then the client 133 sends the request 134 to the server 136. If client 133 is unable to connect to the server 136 because the voice/data connection 138 has degraded by a weak carrier's mobile signal, the Update Process 133 checks the faster data connection network 4G signal and sends the https request 134. Again, if the faster mobile data connection 4G 140 is not available, the Update Process 133 checks the Wi-Fi signal and access the Wi-Fi connection 142 to send the https request 134. When the server 136 receives the request 134, it decrypts the request 134 and checks the version number for new update. The server 136 sends the https response to the client 133 through the internet 135 using the same connection that the client 133 initiated. After the client 133 receives the response, the connection is terminated.

Figure 4:
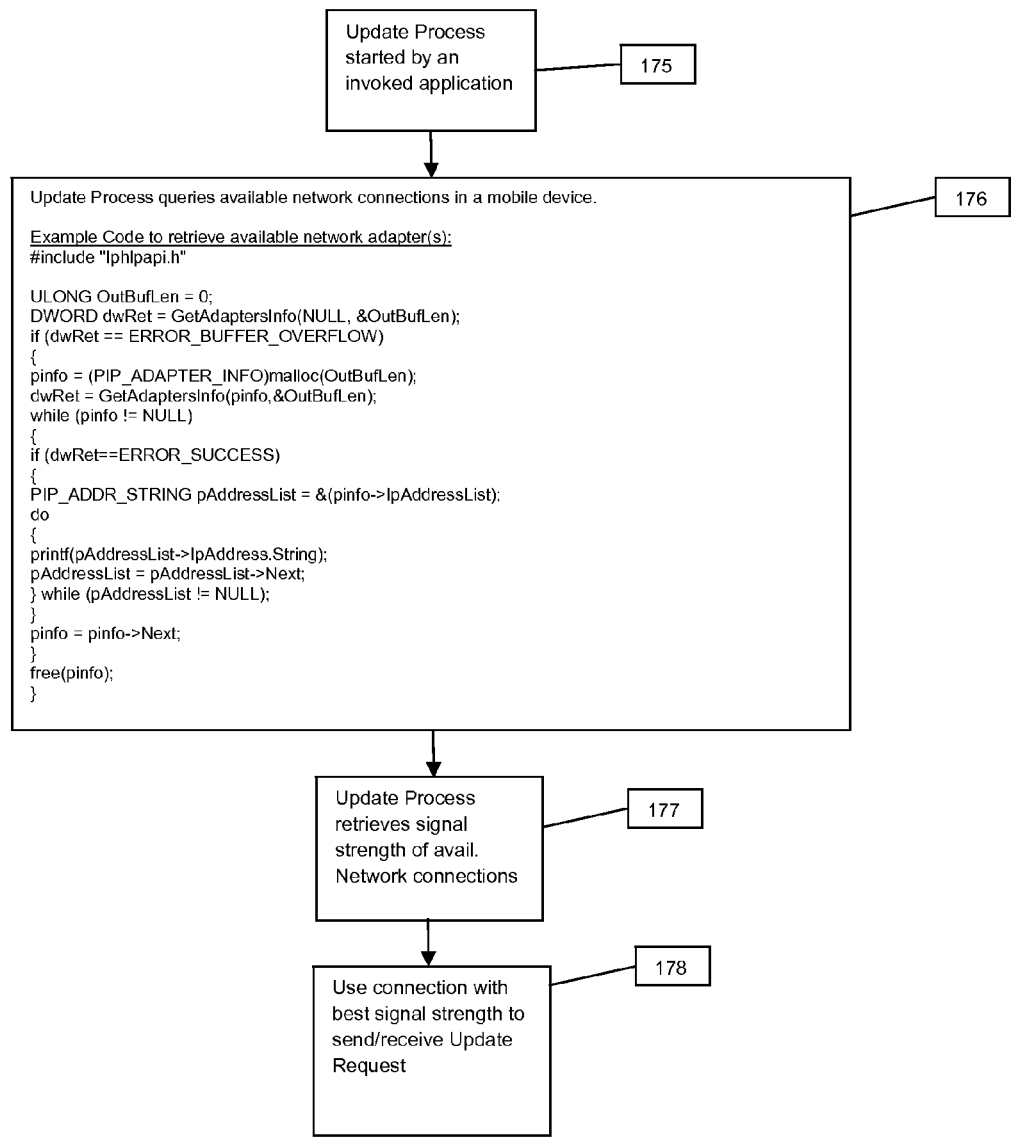
FIG. 4 is a flow chart showing the Update Process determines the best signal strength network connection to send and receive application's update from the Application Vendor's server within a mobile device.

As is shown in the flowchart in FIG. 4, a user invokes an application in a mobile device, on a separated thread, an Update Process start up to automatically check for new software update, in step 175. The Update Process retrieves all available network connections in a mobile device, in step 176. Then, it would retrieve signal strengths of all available networks in a mobile device, in step 177. For example, in a Window mobile device, available network adapters can be determine by using GetAdaptersInfo function in IPHelper APIs of Window Mobile SDK. The signal strength of each available connected network can be retrieved from the registry at the [HKEY_LOCAL_MACHINE\System\State\Phone] location. The "Signal Strength" represents the signal value from 0 to 100. The Window Mobile Operating System uses this value to show the bars on the phone to represent the current signal strength for each connected network. The Update Process can use RegistryNotifyCallback function in Windows Mobile SDK to get notified when the registry value change and to retrieve the values from different connected network. The connected network with the strongest signal strength is used to send update request to the application vendor's server, in step 178.

Figure 5:
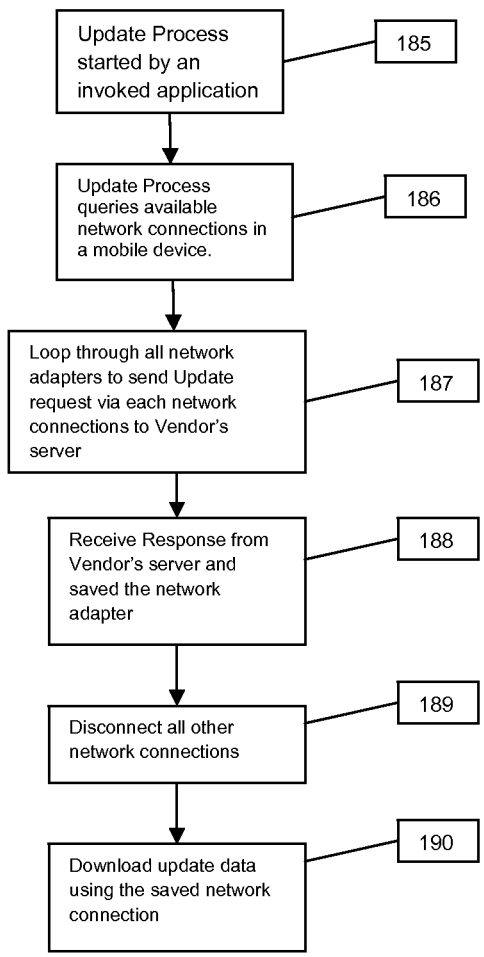
FIG. 5 is a flow chart showing the Update Process sends request via each of the available network connections to the Vendor's server. Then, the first network connection that receives response from the Vendor's server is the fastest network. The same network connection is used to download update data if any. All other network connections are disconnected from the Vendor's server and ignored the response.

As is shown in the flowchart in FIG. 5, an Update Process retrieves all available network connections in a mobile device, in step 186. Once the Update Process queries all available Network connection in the mobile device, it can send request to the vendor server using each of the available Network connection, in step 187. For example, in a Window mobile device, available network adapters can be determine by using GetAdaptersInfo function in IPHelper APIs of Window Mobile SDK. Then, WebRequest Class can be use to send http request to the Vendor server to query for Update data. The same request will be initiates and send via each network adapter to the Vendor's server and the $1^{st}$ response received by the Update Process is used to determine if Update Data is available for download, in step 188. All other responses from other network adapter are ignored and disconnect from the Vendor's server, in step 189. If the user wants to download the update data, the same network adapter that received the $1^{st}$ response is used to send request for download, step 190.

Figure 6:
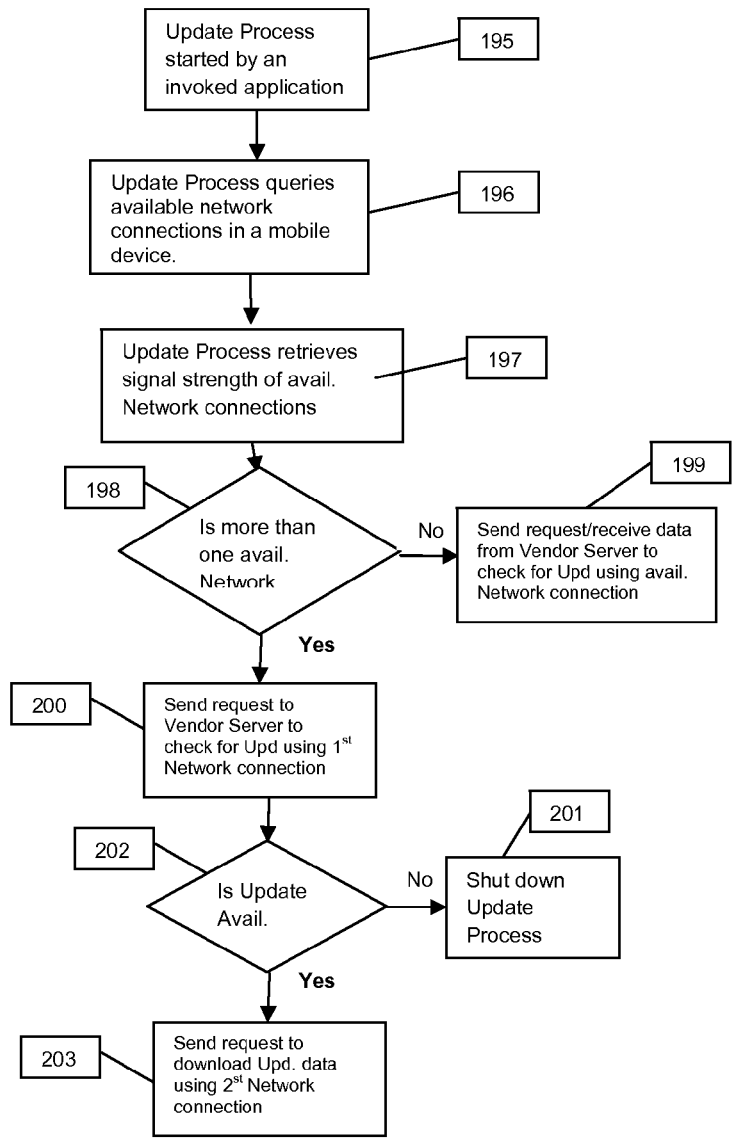
FIG. 6 is a flow diagram showing the Update Process sends and receives update data using multiple network connections.

As is shown in the block diagram in FIG. 6, the Update Process retrieves all available network connections in a mobile device, in step 196. Then, it retrieves the signal strength of each network connections to determine which network connection has strong signal strength, in step 197. If there is only one connected network connection, the Update Process uses it to check for new updated data and download if it is available, in step 199. If there are two connected network adapters that are available to route data to the Vendor server, in step 198, the Update Process will use the first network connection, usually the Voice/Data connection to send the request to check for Update data, in step 200. If there is available Update data for the invoke application, in step 202, the second request to download the updated data can be sent from the second network connection, usually the Faster Data connection or the Wi-Fi connection, to download the updated data, in step 203. When multiple applications invoke in a mobile device, the Update Process of each application can use the default voice/data connection to check for updated data. If there is new updated data and the user wants to update the running applications, the Update Process will use the second available network connection to download the data for updating the application.

Figure 7:
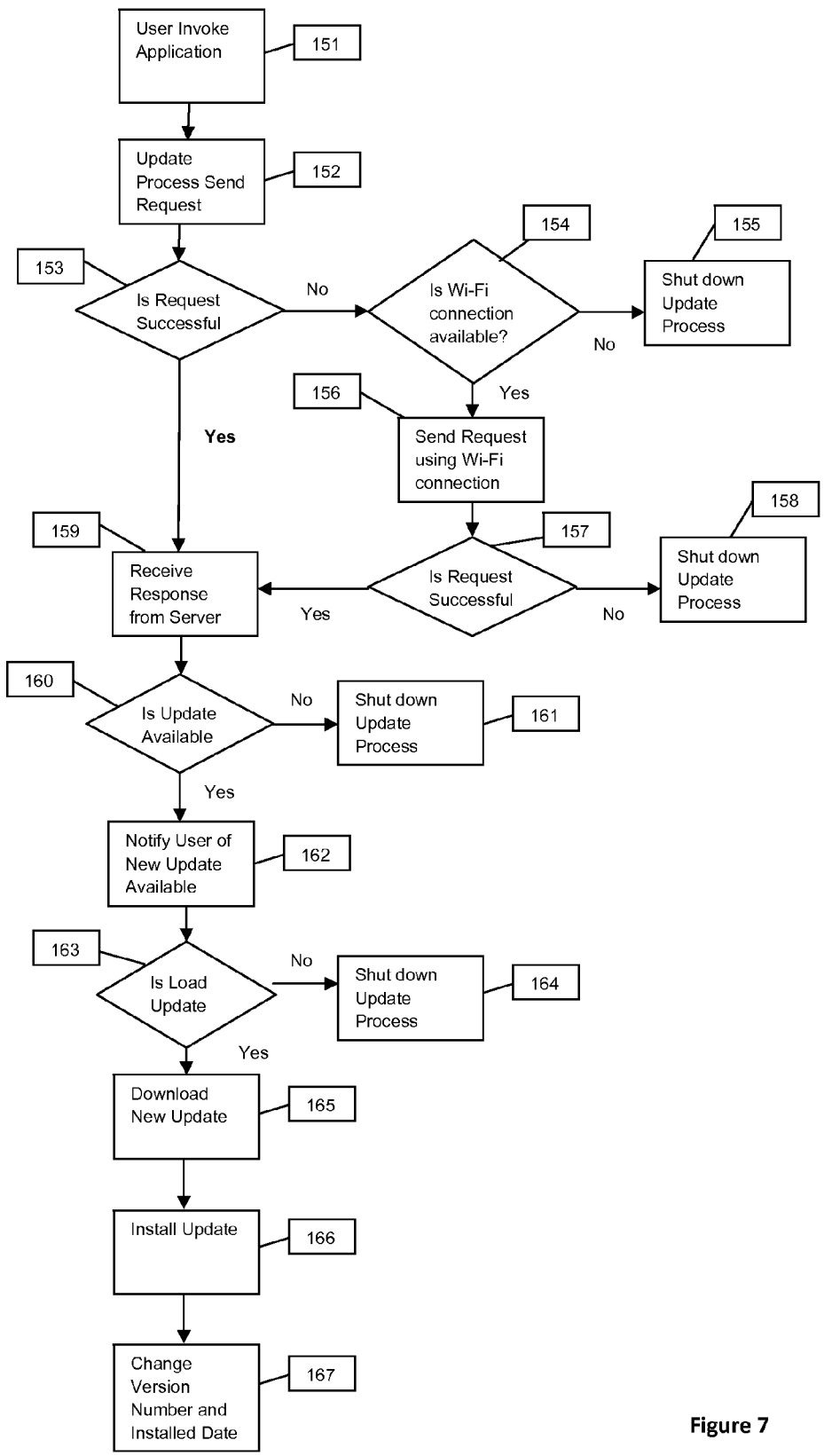
FIG. 7 is a flow diagram showing the detail logic of the Update Process in a mobile device that sends and receives the check for update data. It also shows whether to download the update data based on the user notification.

As is shown in the flowchart in FIG. 7, a user invoke an application in a mobile device, on a separated thread, an Update Process start up to automatically check for new software update, in step 151. The Update Process retrieves application data and sends an http request to the Vendor's secured web server using the primary network connection in step 152. The process of sending an http request includes a request to connect to the Vendor's web server. Step 153 checks to see the connection and sending the update request is successful. If the established of connection and/or sending update request failed because of weak or non-existent carrier's mobile signal, the Update Process check to see if there is a secondary network connection usually a Wi-Fi network, available, in step 154. If the secondary network not available, the Update Process shut down, in step 155. If the secondary network is available, the Update Process connects and sends the same request to the Vendor's server, in step 156. In step 157, the Update Process check to see if the update request is successfully sent to the Vendor's server. If the request failed to send, the Update Process shut down, in step 158. If the request is successfully sent, the Update Process wait to receive a response from the Vendor's server to see whether an update is available for download, in step 159 and 160. If new update is not available because the installed application is already up to date, expired application if it is a subscription purchase, or not a genius application in term of illegal copied, the Update Process terminates itself, in step 161. If the new update is available, the Update Process notifies the user of the new update is available for download or it can wait until the user initiate the shutdown of the application then notifies the user of new update, in step 162. The notification can be a pop up dialog to ask the user for permission to download the new update or on the application's window where the user can download the new update via the menu option, in step 163. If the user doesn't want the download new update, the Update Process terminates itself, in step 164. If the user wants to download new update, the Update Process will send another secured request to the Vendor's server to request for the download of the new update, step 165. The Vendor's server can send the new update to the client application via an http response or the server can send the location of the new update data for the client application. The location can be a domain name or an IP Address to where the new update stored. Once the client receives the new update, or downloads from the server, it installs the new update to the application, step 166. If the installation is successful, the Update Process updates the version number and installed date in the application then shut down, in step 167.

Figure 8:
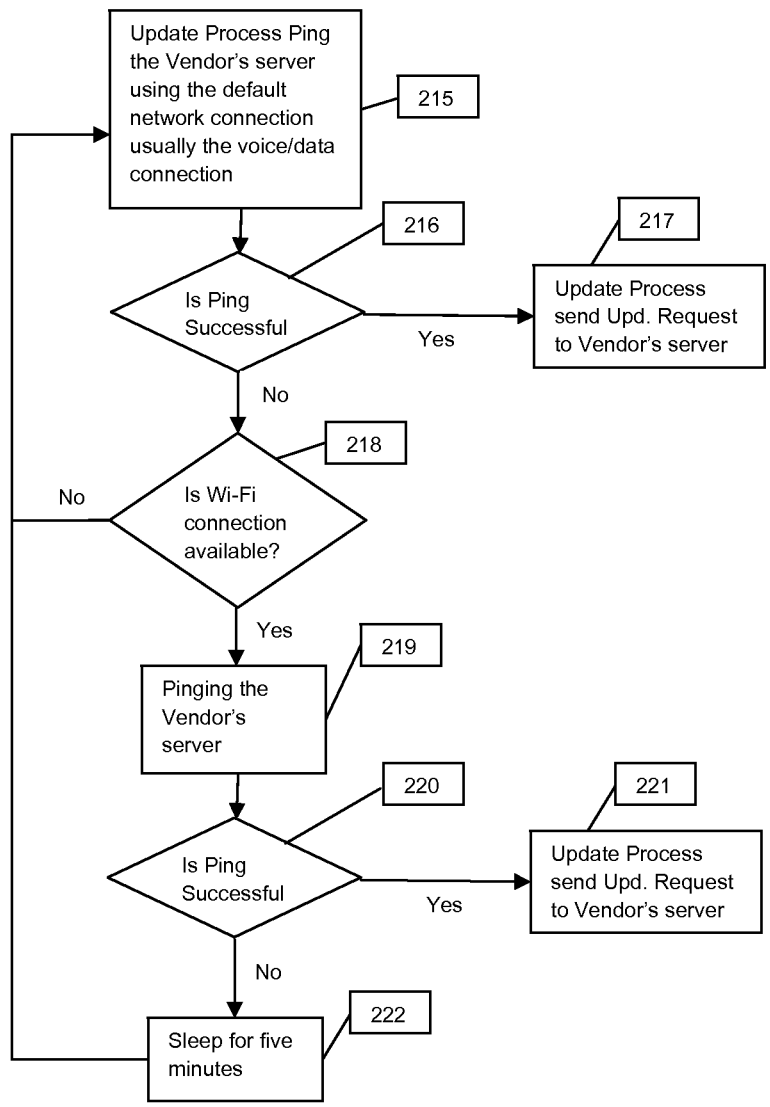
FIG. 8 is a flow diagram showing an alternate embodiment for the Update Process continues to check for update even when the network is not available instead of shut down the Update Process. The Update Process sends a Ping to the Vendor's server via each available network on a mobile device in a timely interval until a ping response is received.

FIG. 8 is a flow chart shows an alternate embodiment of the Update Process. Instead of terminates itself if all network connections on a mobile device aren't available to send update request, the Update Process will retrieve all available network connections, then start to ping the Vendor's server via the first network connection, in step 215. If the ping is successful, the Update Process will check for application update, in step 217, then shutdown the process. If the ping is not successful, the Update Process checks for the next network connection, in step 218. If the next network connection is available, usually the Wi-Fi connection, the Update Process will ping the vendor's server, in step 219. If the ping successful, then the Wi-Fi connection is used to check for application update, in step 221, then shutdown the process. If the ping is not successful, the Update Process will sleep for five minutes or any timing interval that set by the application vendor, in step 222. The purpose of the sleep step at the end of the loop is to make sure the Update Process will not to take all processing power of the mobile device.

The current invention provides at least the following:

Multiple applications running on a Network capable device can use multiple available network connections to send and receive data.

An application running on a Mobile device like a smart phone dynamically determines which network connection to use in case of network routing failure.

Application update can automatically or manually check for software update using one or more network connections.

The Application update notification can be right after the Vendor's server response or when the user initiates the termination of the application.

The check for new update can be an http request with secured connection to the Vendor's web server.

I claim:

1. A method, comprising:
    exchanging, by a network device, packets with at least one hub device responsive to an execution of at least one application;
    intercepting, by a routing application stored on the network device, a request for an update process and first packets initiated from a first application of the at least one application, wherein the request comprises a hypertext transfer protocol request that connects to a web server using secured socket layer protocol;
    modifying source IP addresses of the first packets initiated from the first application corresponding to a first network interface controller (NIC) of the network device, by the routing application stored on the network device; and
    re-injecting the modified first packets and routing the modified first packets to a first hub via the first NIC.

2. The method of claim 1, comprising transmitting a request for a web page, wherein the at least one application is a web browser.

3. The method of claim 1, wherein the transmitting and receiving packets between the network device and the at least one hub device responsive to the executed at least one application comprises transmitting and receiving the packets between the network device and a corresponding plurality of hub devices.

4. The method of claim 1 comprising executing the at least one application on the network device.

5. The method of claim 1, wherein the at least one application comprises the update process.

6. The method of claim 1, further comprising:
    intercepting second packets initiated from a second application and modifying source IP addresses of the second packets corresponding to a second NIC of the network device; and
    re-injecting the modified second packets and routing the modified second packets to a second hub via the second NIC.

7. The method of claim 6, wherein when the first or second packets are unable to be routed to their intended destination due to a network failure, the method further comprises modifying source IP addresses of at least one of the first packets and the second packets and routing at least one of the modified first packets and the modified second packets via a next available NIC of the network device.

8. A device, comprising:
a transmitter configured to transmit packets to, and a receiver configured to receive packets from, at least one hub device responsive to an execution of at least one application; and
a routing application configured to
intercept a request for an update process related to the at least one application and first packets initiated from a first application of the at least one application, wherein the request comprises a hypertext transfer protocol request that connects to a web server using secured socket layer protocol,
modify source IP addresses of the first packets initiated from the first application corresponding to a first network interface controller (NIC) of the network device, and
re-inject the modified first packets and route the modified first packets to a first hub via the first NIC.

9. The device of claim 8, wherein the at least one application is a web browser and the transmitter is configured to transmit packets comprising a request for a web page.

10. The device of claim 8, wherein the network device is further configured to transmit and receive packets to a corresponding plurality of hub devices.

11. The device of claim 8, comprising a processor configured to execute the at least one application.

12. The device of claim 8, wherein the application comprises the update process.

13. The device of claim 8, wherein the routing application is further configured to intercept second packets initiated from a second application and modify source IP addresses of the second packets corresponding to a second NIC of the network device, and re-inject the modified second packets and route the modified second packets to a second hub via the second NIC of the network device.

14. The device of claim 13, wherein when the first or second packets are unable to be routed to their intended destination due to a network failure, the routing application is further configured to modify source IP addresses of at least one of the first packets and the second packets and route at least one of the modified first packets and the modified second packets via a next available NIC of the network device.

15. A non-transitory computer readable storage medium configured to store instructions that, when executed, are configured to cause a processor to:
exchange, by a network device, packets with at least one hub device responsive to an execution of at least one application;
intercept, by a routing application stored on the network device, a request for an update process and first packets initiated from the at least one application, wherein the request comprises a hypertext transfer protocol request that connects to a web server using secured socket layer protocol;
modify source IP addresses of the packets initiated from the first application corresponding to a first network interface controller (NIC) of the network device, by the routing application stored on the network device; and
re-inject the modified first packets and route the modified first packets to a first hub via the first NIC.

16. The non-transitory computer readable storage medium of claim 15, wherein the at least one application is a web browser and the transmitting of the packets comprises transmitting a request for a web page.

17. The non-transitory computer readable storage medium of claim 16, wherein the transmitting and receiving of the packets between the network device and the at least one hub device responsive to the executed at least one application comprises transmitting and receiving the packets between the network device and a corresponding plurality of hub devices.

18. The non-transitory computer readable storage medium of claim 16, the instructions further configured to cause the processor to execute the at least one application on the network device, wherein the application comprises the update process.

19. The non-transitory computer readable storage medium of claim 15, the instructions further configured to cause the processor to:
intercept second packets initiated from a second application and modify source IP addresses of the second packets corresponding to a second NIC of the network device; and
re-inject the modified second packets and route the modified second packets to a second hub via the second NIC.

20. The non-transitory computer readable storage medium of claim 15, wherein when the first or second packets are unable to be routed to their intended destination due to a network failure, the instructions are further configured to cause the processor to modify source IP addresses of at least one of the first packets and the second packets and route at least one of the modified first packets and the modified second packets via a next available NIC of the network device.

* * * * *